(12) United States Patent
Blanc et al.

(10) Patent No.: US 9,127,757 B2
(45) Date of Patent: Sep. 8, 2015

(54) DEVICE FOR TRANSMITTING A MOVEMENT FOR SHIFTING GEARS IN A MOTOR VEHICLE GEARBOX

(75) Inventors: Hugues Blanc, Lezigneux (FR); Sebastien Maitre, Monistrol sur Loire (FR)

(73) Assignee: DURA AUTOMOTIVE SYSTEMS SAS, Bievres (FR)

( * ) Notice: Subject to any disclaimer, the term of this patent is extended or adjusted under 35 U.S.C. 154(b) by 292 days.

(21) Appl. No.: 13/701,231

(22) PCT Filed: May 31, 2011

(86) PCT No.: PCT/FR2011/051245
§ 371 (c)(1),
(2), (4) Date: Jan. 4, 2013

(87) PCT Pub. No.: WO2011/151593
PCT Pub. Date: Dec. 8, 2011

(65) Prior Publication Data
US 2013/0104684 A1    May 2, 2013

(30) Foreign Application Priority Data
Jun. 2, 2010 (FR) ...................................... 10 54286

(51) Int. Cl.
*F16H 63/32* (2006.01)
*F16H 21/00* (2006.01)
*F16H 61/24* (2006.01)
*F16H 63/20* (2006.01)
*F16H 59/68* (2006.01)

(52) U.S. Cl.
CPC ................ *F16H 21/00* (2013.01); *F16H 61/24* (2013.01); *F16H 63/20* (2013.01); *F16H 2059/6823* (2013.01); *F16H 2061/242* (2013.01); *F16H 2063/328* (2013.01); *Y10T 74/20177* (2015.01)

(58) Field of Classification Search
CPC ........................... F16H 63/32; F16H 2063/328
USPC .......................................... 74/473.36, 473.37
See application file for complete search history.

(56) References Cited

U.S. PATENT DOCUMENTS 5,463,911 A * 11/1995 Knoedel et al. ............. 74/473.36
6,164,151 A * 12/2000 Dutson et al. ............... 74/473.37
2013/0125693 A1* 5/2013 Maitre et al. ................ 74/473.37

FOREIGN PATENT DOCUMENTS

| EP | 1 566 579 | * | 8/2005 |
| EP | 1705408 A2 | | 9/2006 |
| FR | 2779794 A1 | | 12/1999 |
| FR | 2805020 A1 | | 8/2001 |
| JP | 55057925 A | | 4/1980 |
| JP | 57172825 A | | 10/1982 |

OTHER PUBLICATIONS

International Search Report for PCT/FR2011/051245 dated Aug. 24, 2011.

* cited by examiner

*Primary Examiner* — William C Joyce
(74) *Attorney, Agent, or Firm* — Heslin Rothenberg Farley & Mesiti P.C.

(57) ABSTRACT

At least one insert is overmoulded in a body made of a thermoplastic resin. The at least one insert has a modulus of elasticity at least twice as high as that of the thermoplastic resin and is shaped to constitute a selector cooperating with a recess of a selected crosspiece. The thermoplastic resin is capable of linking the function or functions performed by the at least one insert.

7 Claims, 2 Drawing Sheets

DEVICE FOR TRANSMITTING A MOVEMENT FOR SHIFTING GEARS IN A MOTOR VEHICLE GEARBOX

CROSS REFERENCE TO RELATED APPLICATIONS

This application is a national stage filing under section 371 of International Application No. PCT/FR2011/051245 filed on May 31, 2011, and published in French on Dec. 8, 2011 as WO 2011/151593 A1 and claims priority of French application No. 1054286 filed on Jun. 2, 2010, the entire disclosure of these applications being hereby incorporated herein by reference.

BACKGROUND ART

This invention relates to the technical sector of gearboxes for motor vehicles.

More particularly, the invention concerns the means of the drive chain enabling transmission of the movements of a control lever or other activating device of a gearbox, notably for shifting gears.

In particular, this control means, known by the general term of selector, cooperates with a recess that has a crosspiece fixed in one axis to move a fork for effecting the movement of a sliding sleeve for shifting gears. The selector is subject to any appropriate control mechanism, for example to a control bar connected to the gear lever or suchlike. These arrangements are not described in detail because they are perfectly well known to a person skilled in the art and are likely to form the object of different variants.

The invention lies with the selector, which constitutes a part of the device for transmitting as such a movement for shifting the different gears.

According to the state of the art, a selector is made directly by casting, forming a one-piece assembly of considerable mass. Now, in the motor vehicle field, there is a constant desire to make weight savings. Costs are also important, given that investment casting must be used which, nevertheless, does not do away with the need for certain fabrication reworks.

The aim of the invention is to overcome these drawbacks in a simple, certain, effective and rational manner.

The problem that the invention proposes to solve is no longer to create this type of device by investment casting but by using, for part of it, an injected plastics material, bearing in mind that these parts work in aggressive environments, being subjected to high temperatures and vibrations.

BRIEF SUMMARY OF THE INVENTION

In order to solve this problem, a device for transmitting a movement for shifting gears in a motor vehicle gearbox has been designed and perfected, which comprises at least one insert, overmoulded in a body made of a thermoplastic resin, whose modulus of elasticity is at least twice as high as that of the thermoplastic resin and shaped to constitute a selector capable of cooperating with a recess of a selected crosshead, the said thermoplastic resin being capable of linking the function or functions performed by the insert or inserts.

Advantageously, the device also comprises:
one insert shaped to constitute a shaft, one end of which is capable of cooperating with a gear shift and selection grid;
one insert shaped to constitute a cam profile serving as a ball run, noting that such a cam profile is very difficult to machine after casting, when the assembly is obtained by casting;
one insert shaped to constitute a ring for housing a control bar.

Advantageously, considering the difficult conditions in which the device operates, the plastics material used is a PPA thermoplastic resin, in particular a PPA-GF50 resin, although other materials are not ruled out.

According to another characteristic, the other end of the shaft is provided with a sensor to detect the dead centre position.

The ring for housing the control bar is inserted, after overmoulding the body, into an orifice communicating with a through-hole to engage a means of locking in a translational and rotational manner the said bar. The locking means may be a pin.

BRIEF DESCRIPTION OF THE DRAWING FIGURES

The invention is described below in detail with the aid of the accompanying drawings, in which.

DETAILED DESCRIPTION

According to the invention, the transmission device, in particular for shifting gears in a motor vehicle gearbox, comprises at least one, but advantageously several inserts (1), (2), (3), (5) each corresponding to a specific function, the said inserts being overmoulded in a body made of a thermoplastic resin (4) capable of linking the different functions performed by these inserts. The inserts have a modulus of elasticity at least twice as high as that of the thermoplastic resin. For example, the inserts are of metal.

The insert (1) constitutes a selector capable of cooperating, in a known manner and as indicated, with a recess (E) of a crosspiece (C) cooperating with a fork (F) for effecting the translational movement of a sliding sleeve (B). The insert (1) which constitutes the selector is made, for example, from a flattened iron bar having a substantially S-shaped profile. This iron bar can also have cut-outs (1a) in order to reduce the weight.

Figure 1:
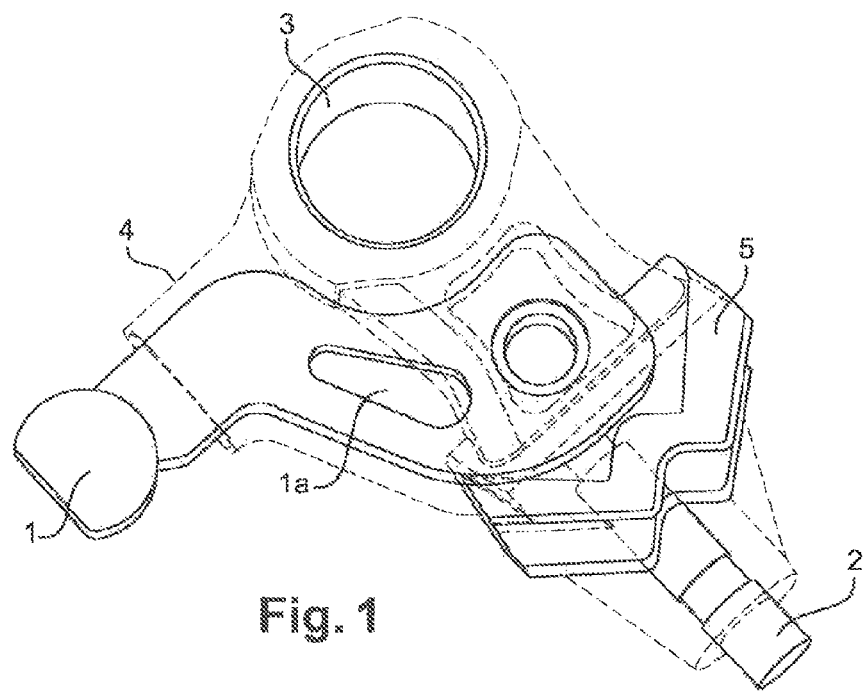
FIG. 1 is a perspective view of the different inserts suitably positioned in a mould before injection of the plastics material.
Figure 2:
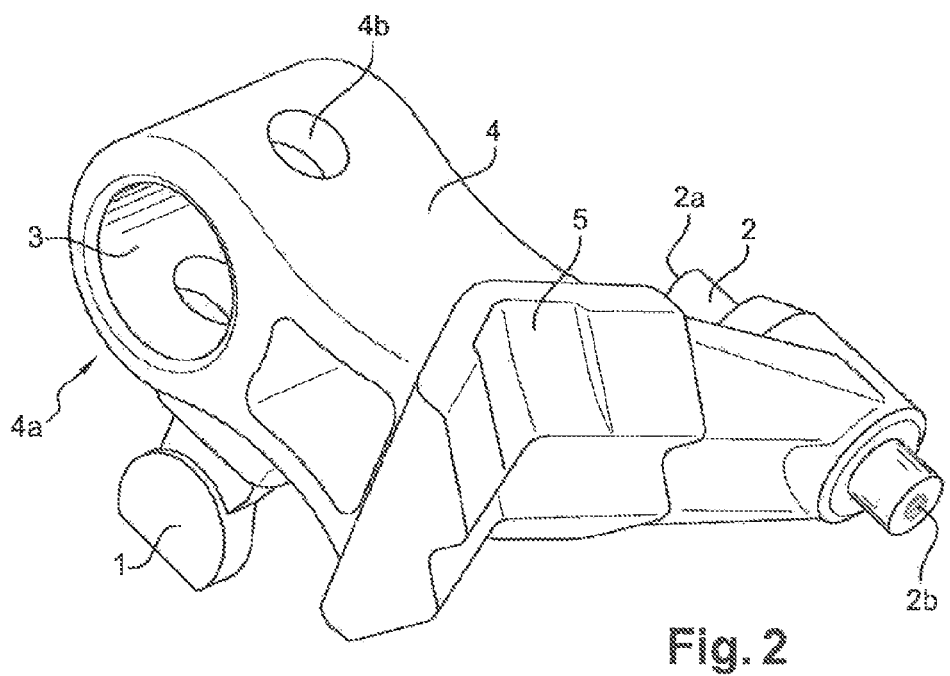
FIG. 2 is a perspective view corresponding to FIG. 1 after injection of the plastics material.
Figure 3:
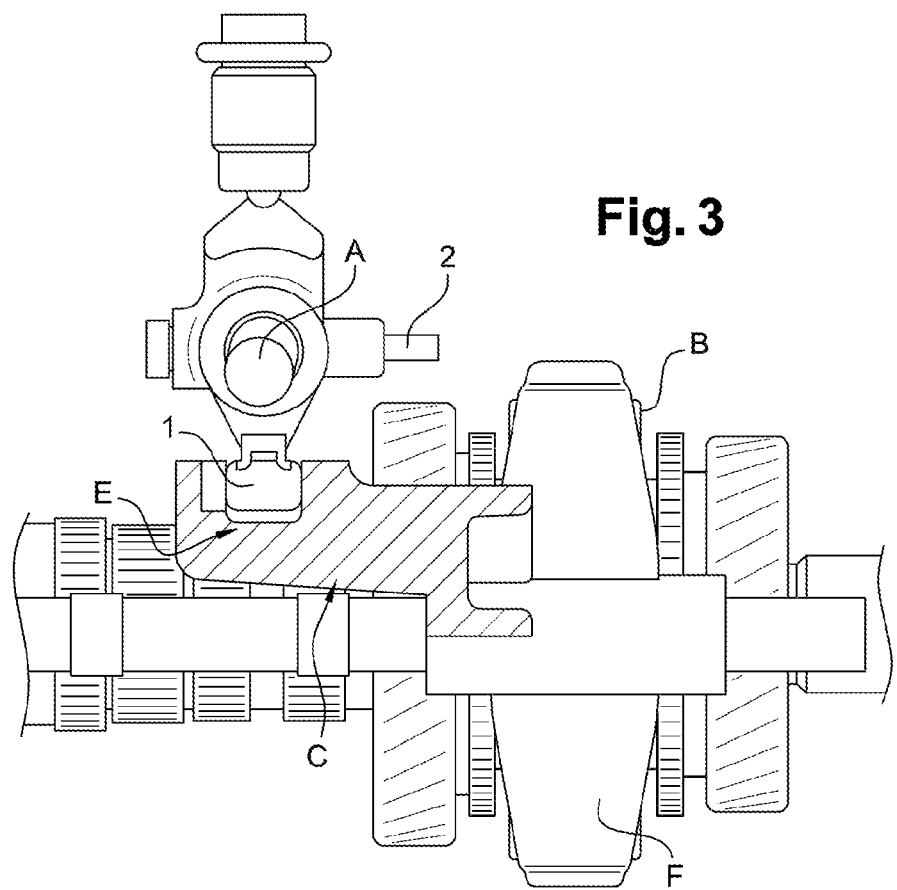
FIG. 3 is a partial perspective view of an example of part of the drive chain enabling the transmission of movement on shifting gear.
Figure 4:
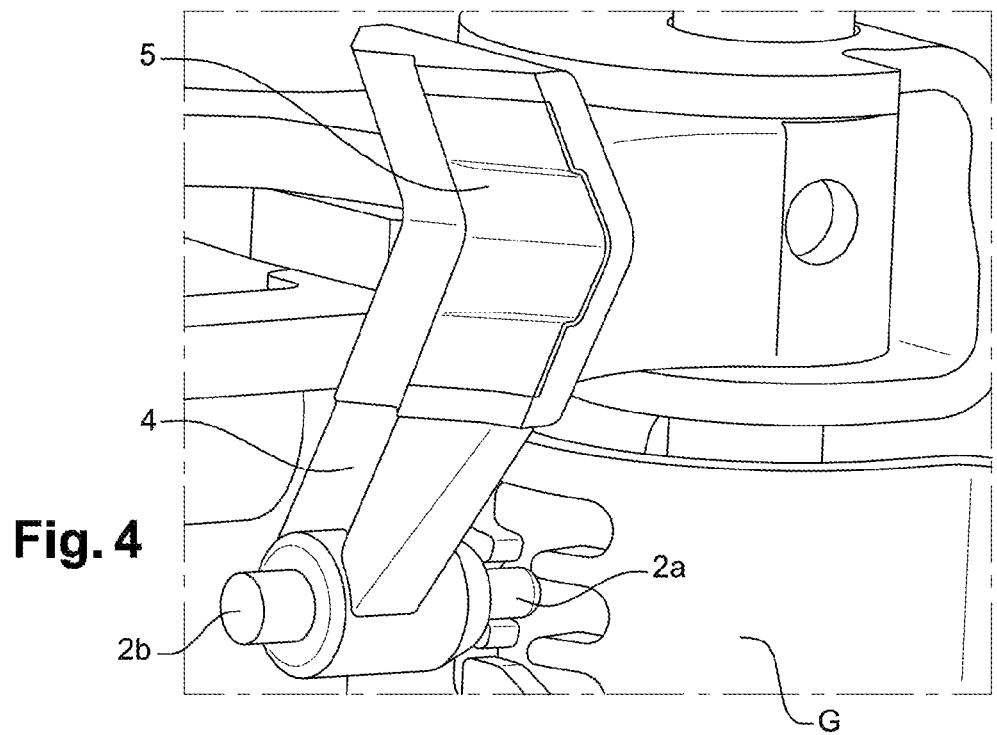
FIG. 4 is a perspective view showing an installation example of the device in a part of the gearbox drive chain.

The insert (2) constitutes a shaft one end of which (2a) is capable of cooperating with a gear shift and selection grid (G) (FIG. 4). The other end (2b) of the shaft (2) can be provided with a sensor to detect the "dead centre" position. This arrangement is advantageous in the case of a vehicle provided, in a known way, with a STOP and START system, enabling automatic stopping and starting of the motor vehicle.

The insert (3) constitutes a ring for housing a control bar (A). This ring (3) is inserted, after overmoulding the body (4), into an orifice (4a), communicating with a through-hole (4b) to engage a means of locking the said bar in a translational and rotational manner. This locking means can, for example, be a pin.

The insert (5) constitutes a cam profile capable of enabling an indexation at dead centre, serving as a ball run.

Advantageously, the material used for the body (4) is a thermoplastic resin charged, in particular, with glass fibres, such as PPA GF50, PPA-6.6 and PPA-6.4.

The advantages clearly emerge from the description, in particular, we would stress and restate:

- the weight saving achieved (around 60% compared with a part obtained by casting);
- virtually doing away with fabrication re-works;
- the reduction in costs contrasted with the investment casting technique;
- the ease of obtaining the three-dimensional cam profile.

The invention claimed is:

1. Device for transmitting a movement for shifting gears in a motor vehicle gearbox, comprising inserts, overmoulded in a single body made of a thermoplastic resin, the inserts having a modulus of elasticity at least twice as high as a modulus of elasticity of the thermoplastic resin, the inserts including a first insert shaped to constitute a selector adapted to cooperate with a recess of a selected crosspiece, a second insert shaped to constitute a shaft, and having one end adapted to cooperate with a gear shift and selection grid, a third insert shaped to constitute a cam profile serving as a ball run, and a fourth insert shaped to constitute a ring for housing a control bar, the thermoplastic resin body linking functions performed by the inserts.

2. Device according to claim 1, wherein an other end of the shaft is provided with a sensor to detect a dead center position of the one end of the shaft relative to the gear shaft and selection grid.

3. Device according to claim 1, wherein the fourth insert is inserted, after overmoulding the body, into an orifice communicating with a through-hole to engage a means of locking the control bar in a translational and rotational manner.

4. Device according to claim 3, wherein the locking means comprises a pin.

5. Device according to claim 1, wherein the thermoplastic resin is charged with glass fibers.

6. Device according to claim 1, wherein the first insert comprises a flattened bar having a substantially S-shaped profile.

7. Device according to claim 6, wherein the flattened bar includes at least one cut-out.

* * * * *